(12) United States Patent
Lo

(10) Patent No.: US 11,789,282 B2
(45) Date of Patent: Oct. 17, 2023

(54) PROJECTION APPARATUS

(71) Applicant: Coretronic Corporation, Hsin-Chu (TW)

(72) Inventor: Yi-Chien Lo, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 6 days.

(21) Appl. No.: 16/812,386

(22) Filed: Mar. 9, 2020

(65) Prior Publication Data
US 2020/0292835 A1 Sep. 17, 2020

(30) Foreign Application Priority Data
Mar. 14, 2019 (CN) .......................... 201910192254.0

(51) Int. Cl.
*G02B 27/09* (2006.01)
*G02B 27/12* (2006.01)
(Continued)

(52) U.S. Cl.
CPC ....... *G02B 27/0955* (2013.01); *G02B 27/126* (2013.01); *G02B 27/283* (2013.01); *G03B 21/008* (2013.01); *G03B 21/208* (2013.01)

(58) Field of Classification Search
CPC ... G02B 2027/0105–0198; G02B 27/01–0189; G03B 21/00–64; H04N 9/31–3197
See application file for complete search history.

(56) References Cited

U.S. PATENT DOCUMENTS 5,504,629 A * 4/1996 Lim ..................... H04N 9/3152
348/E9.027
7,216,988 B2 5/2007 Kitabayashi
(Continued)

FOREIGN PATENT DOCUMENTS

CN 101855902 10/2010
CN 102375315 3/2012
(Continued)

OTHER PUBLICATIONS

"Office Action of China Counterpart Application", dated Apr. 26, 2021, p. 1-p. 9.
(Continued)

*Primary Examiner* — Bao-Luan Q Le
*Assistant Examiner* — Christopher A Lamb, II
(74) *Attorney, Agent, or Firm* — JCIPRNET (57) ABSTRACT

A projection apparatus including an illumination system and a projection imaging system is provided. The illumination system is adapted to emit an illumination beam, and the illumination system includes a light source module and a light shaping module. The light source module is adapted to emit at least one beam. The light shaping module is disposed on the transmission path of the at least one beam. The at least one beam forms an illumination beam after passing through the light shaping module, and the illumination beam has a light imaging matching angle. The light shaping module includes at least one first lens element. The at least one first lens element is disposed on the transmission path of the at least one beam. The projection imaging system is disposed on a transmission path of the illumination beam. The projection apparatus is suitable for eliminating stray light and crosstalk of images.

21 Claims, 9 Drawing Sheets

(51) Int. Cl.
  *G02B 27/28* (2006.01)
  *G03B 21/00* (2006.01)
  *G03B 21/20* (2006.01)

(56) References Cited

U.S. PATENT DOCUMENTS

| | | |
|---|---|---|
| 2004/0246442 A1 | 12/2004 | Lee et al. |
| 2006/0250696 A1 | 11/2006 | McGuire |
| 2006/0279858 A1 | 12/2006 | Cheng |
| 2008/0158513 A1* | 7/2008 | Bartlett .................. G03B 21/26 353/30 |
| 2009/0161031 A1* | 6/2009 | Kaise .................. H04N 9/3161 349/5 |
| 2010/0027289 A1* | 2/2010 | Aiki ...................... G02B 6/0011 362/558 |
| 2010/0321596 A1 | 12/2010 | Ishikura |
| 2011/0234985 A1 | 9/2011 | Ryf et al. |
| 2015/0070773 A1* | 3/2015 | Wang ........................ G02B 5/30 359/631 |
| 2017/0285452 A1* | 10/2017 | Miura .................. H04N 9/3152 |
| 2017/0299955 A1 | 10/2017 | Kawamura et al. |
| 2018/0031843 A1* | 2/2018 | Pan ....................... H04N 9/3173 |
| 2019/0250456 A1* | 8/2019 | Lo .......................... G02B 30/10 |

FOREIGN PATENT DOCUMENTS

| | | |
|---|---|---|
| CN | 102789122 | 11/2012 |
| CN | 104102079 | 10/2014 |
| CN | 110133859 | 8/2019 |
| TW | 200844631 | 11/2008 |
| TW | 201213858 | 4/2012 |
| TW | 201839494 | 11/2018 |
| TW | 201908856 | 3/2019 |

OTHER PUBLICATIONS

Hong Hua et al., "A 3D integral imaging optical see-through head-mounted display", Optical Society of America, May 28, 2014, pp. 1-8.
"Search Report of Europe Counterpart Application", dated Aug. 28, 2020, p. 1-p. 7.
"Office Action of Taiwan Counterpart Application", dated May 11, 2020, p. 1-p. 9.

\* cited by examiner

PROJECTION APPARATUS

CROSS-REFERENCE TO RELATED APPLICATION

This application claims the priority benefit of China application serial no. 201910192254.0, filed on Mar. 14, 2019. The entirety of the above-mentioned patent application is hereby incorporated by reference herein and made a part of this specification.

BACKGROUND OF THE INVENTION

Field of the Invention

The invention relates to a projection apparatus, and particularly relates to a projection apparatus for a head-mounted display.

Description of Related Art

Through the development of display technologies and following the demands for high-techs, near eye displays (NEDs) and head-mounted displays (HMDs) have emerged as products with great potential nowadays. Currently, the applications relating to NED may be classified into augmented reality (AR) technologies and virtual reality (VR) technologies. Amongst the applications, since light field near eye displays (LFNEDs) have current light field information, such displays are capable of refocusing and therefore able to provide image information with depth. Consequently, LFNEDs are broadly applied in AR and VR technologies using NFD technologies. However, in the conventional light field displays, an image beam may easily become stray light through the imaging system and result in cross-talk, and the resolution may drop significantly as the depth of the image information expands.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention were acknowledged by a person of ordinary skill in the art.

SUMMARY

The invention provides a projection apparatus having favorable image quality and resolution.

Other objects and advantages of the present invention can be further illustrated by the technical features broadly embodied and described as follows.

In order to achieve one or a portion of or all of the objects or other objects, one embodiment of the present invention provides a projection apparatus. The projection apparatus includes an illumination system and a projection imaging system. The illumination system is adapted to emit an illumination beam, and the illumination system includes a light source module and a light shaping module. The light source module is adapted to emit at least one beam. The light shaping module is located on a transmission path of the at least one beam and adapted to adjust a light shape of the at least one beam. The at least one beam forms the illumination beam after passing through the light shaping module, and the illumination beam has a light imaging matching angle. The light shaping module includes at least one first lens element located on the transmission path of the at least one beam and adapted to adjust uniformity of the at least one beam. The projection imaging system is disposed on a transmission path of the illumination beam, and the projection imaging system includes a reflective light valve disposed on the transmission path of the illumination beam. The reflective valve is adapted to modulate the illumination beam into an image beam.

Based on the above, the embodiments of the invention exhibit at least one of the following properties or effects. In the embodiments of the invention, by configuring the light shaping module, the illumination beam formed by the illumination system forms the suitable light imaging matching angle and the sub-beams of the illumination beam also have suitable unit light divergence angles. In addition, with the illumination beam formed by the illumination system, the projection apparatus is also able to meet the requirements of the light path in a specific projection imaging system, thereby eliminating stray light or crosstalk of images and rendering favorable image quality and resolution.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1A:
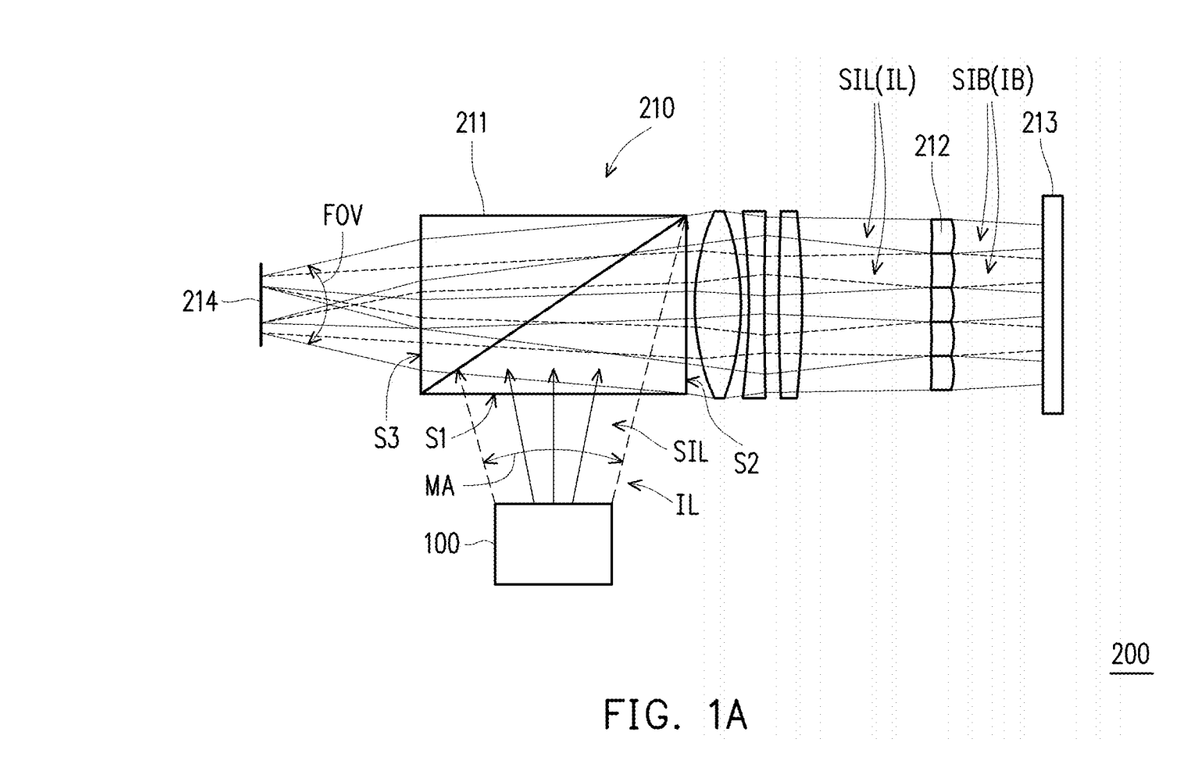
FIG. 1A is a schematic view illustrating an optical framework of a projection apparatus according to an embodiment of the invention.
Figure 1B:
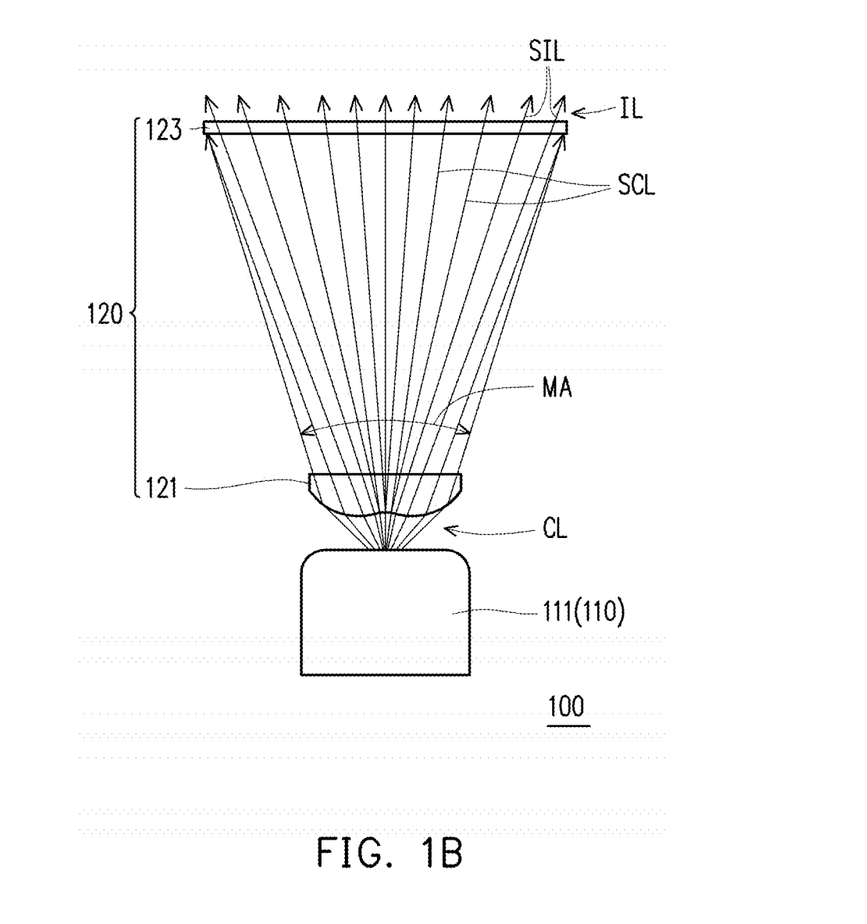
FIG. 1B is a schematic view illustrating an optical framework of an illumination system of FIG. 1A.
Figure 1C:
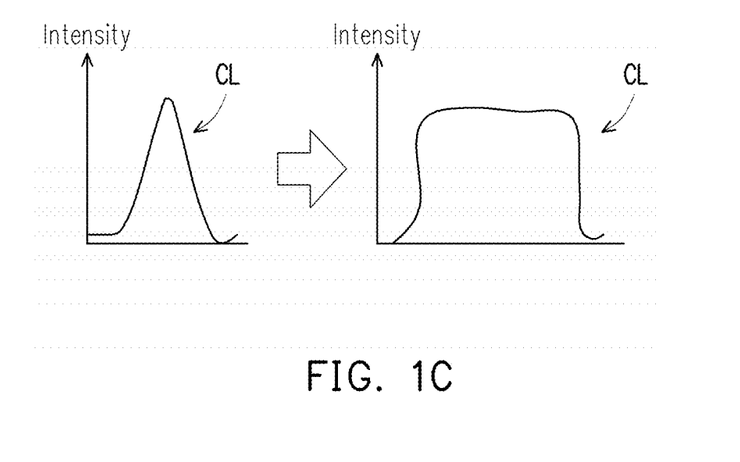
FIG. 1C is a schematic diagram illustrating the uniformity distributions of light intensity before and after an illumination beam of FIG. 1B passes through a first lens element.
Figure 1D:
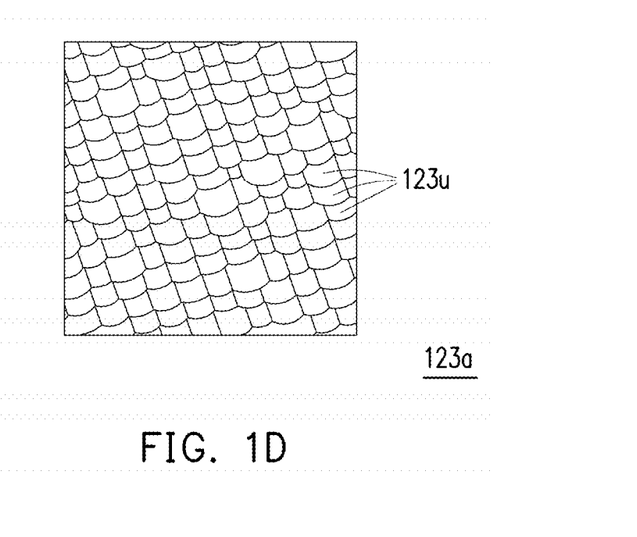
FIG. 1D to FIG. 1F are schematic views of different light diffusing elements of FIG. 1B.
Figure 1E:
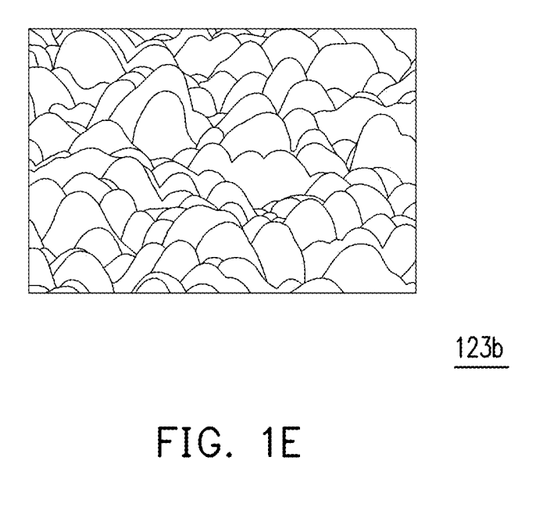
Figure 1F:
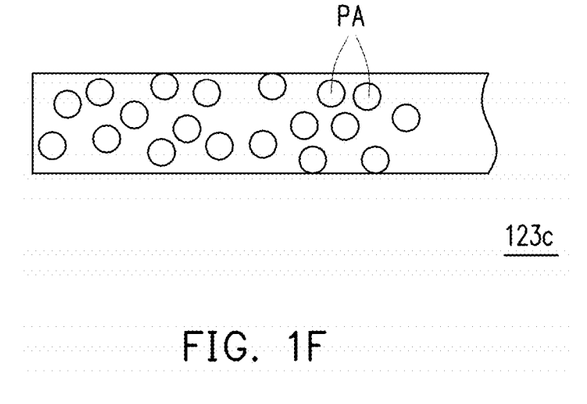
Figure 1G:
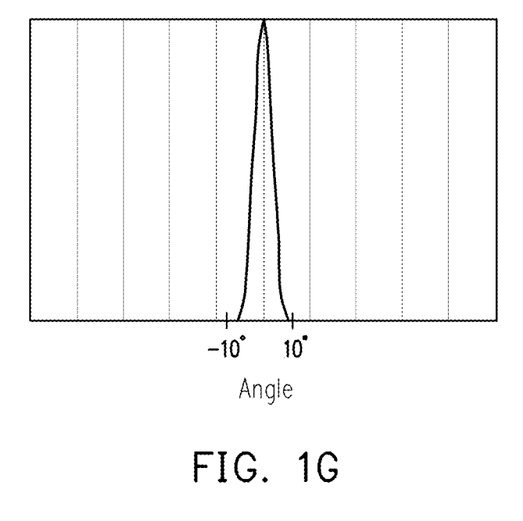
FIG. 1G is a diagram illustrating a light shape distribution of sub illumination beams of FIG. 1B.
Figure 1H:
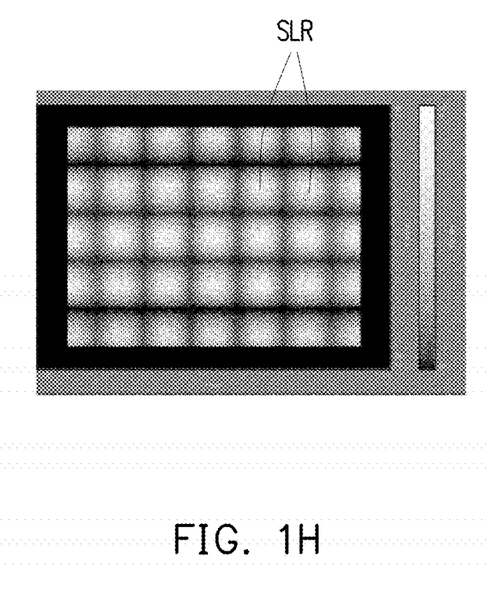
FIG. 1H is a schematic view illustrating a distribution of a plurality of illumination sub-regions formed by the sub illumination beams of FIG. 1A.

FIG. 1A is a schematic view illustrating an optical framework of a projection apparatus according to an embodiment of the invention. FIG. 1B is a schematic view illustrating an optical framework of an illumination system of FIG. 1A. FIG. 1C is a schematic diagram illustrating the uniformity distributions of light intensity before and after an illumination beam of FIG. 1B passes through a first lens element. FIG. 1D to FIG. 1F are schematic views of different light diffusing elements of FIG. 1B. FIG. 1G is a diagram illustrating a light shape distribution of sub illumination beams of FIG. 1B. FIG. 1H is a schematic view illustrating a distribution of a plurality of illumination sub-regions formed by the sub illumination beams of FIG. 1A. Referring to FIGS. 1A and 1B, in the embodiment, a projection apparatus 200 may be a near eye display apparatus, and is adapted to be disposed in front of at least one eye of a user. Specifically, as shown in FIG. 1A, the projection apparatus 200 includes an illumination system 100 and a projection imaging system 210. Specifically, as shown in FIGS. 1A and 1B, the illumination system 100 is adapted to emit an illumination beam IL, and the illumination system 100 includes a light source module 110 and a light shaping module 120. The light source module 110 is adapted to emit at least one beam CL, and the light shaping module 120 is located on a transmission path of the at least one beam CL and is adapted to adjust a light shape of the at least one beam CL. After passing through the light shaping module 120, the at least one beam CL forms the illumination beam IL, and the illumination beam IL has a light imaging matching angle MA. The light shape of the at least one beam CL is a cross-sectional shape of a light spot of the beam, for example, and the cross-sectional shape of the light spot is adjusted by the light shaping module 120.

More specifically, as shown in FIG. 1B, in the embodiment, the light source module 110 includes at least one light emitting element 111 adapted to provide the at least one beam CL. For example, the at least one light emitting element 111 is a laser light emitting element (e.g., laser diode), and the at least one beam CL is a collimated beam. In general, in order for the illumination beam IL formed after the at least one beam CL exits the illumination system 100 to satisfy the required range of field of view of a light path in the projection imaging system 210 and provide a range of divergence angle that needs to be satisfied when respective sub image beams SIB formed by the projection imaging system 210 are transmitted to a pupil 214, the overall light shape of the illumination beam IL needs to satisfy a specific range of light emitting angle (i.e., the light imaging matching angle MA), and a plurality of corresponding sub illumination beams SIL in the illumination beam IL for providing the respective sub image beams SIB also need to have divergence angles corresponding to the respective sub image beams SIB. However, in the embodiment, since the light emitting element 111 is a laser light emitting element, the etendue of the light distribution of the provided at least one beam CL is very small and not uniform. Besides, since the etendue of the at least one beam CL is excessively small, the divergence angles of the sub illumination beams SIL of the illumination beam IL for providing the respective sub image beams SIB are also excessively small. Therefore, the light shaping module 120 needs to be used together to adjust the uniformity and the light shape of the at least one beam CL, so as to form the illumination beam IL that meets the requirements of the light path in the projection imaging system 210.

Specifically, as shown in FIG. 1B, in the embodiment, the light shaping module 120 includes at least one first lens element 121 and a light diffusing element 123, and the at least one first lens element 121 and the light diffusing element 123 are located on the transmission path of the at least one beam CL. Specifically, the number of the at least one first lens element 121 of the light shaping module 120 is the same as the number of the at least one light emitting element 111 of the light source module 110, and each light emitting element 111 is disposed in correspondence with each first lens element 121. In the embodiment, the number of the first lens element 121 and the number of the light emitting element 111 are both one. However, the invention is not limited thereto. In other embodiments, the number of the first lens element 121 and the number of the light emitting element 111 may both be plural. Besides, the number of the first lens element 121 and the number of the at least one light emitting element 111 of the light source module 110 may also be different. Nevertheless, the invention is not limited thereto.

More specifically, as shown in FIG. 1B and FIG. 1C, in the embodiment, the at least one first lens element 121 is adapted to adjust the uniformity and the light shape of the at least one beam CL. As shown in FIG. 1C, after passing through the at least one first lens element 121, the at least one beam CL may have an increased light etendue as well as a light shape with uniform light intensity, so as to be projected to the light diffusing element 123. Accordingly, as shown in FIG. 1B, the at least one beam CL may pass through the at least one first lens element 121 and form the illumination beam IL having the light imaging matching angle MA.

Then, as shown in FIG. 1B, in the embodiment, the at least one beam CL may also have a plurality of sub-beams SCL. The light diffusing element 123 is located on transmission paths of the sub-beams SCL. For example, in the embodiment, the light diffusing element 123 may be any one of a microstructure diffuser 123a, a surface-scattering diffuser 123b, a volume-scattering diffuser 123c, and a diffraction optical element (DOE), and is adapted to diffuse the unit light divergence angles of the sub-beams SCL and thereby form the sub illumination beams SIL of the illumination beam IL. Further details will be described in the following with reference to FIGS. 1D to 1F.

For example, in the embodiment of FIG. 1D, the light diffusing element 123 may be a microstructure diffuser 123a, and may have a plurality of microstructure diffusion units 123u. As shown in FIG. 1B and 1D, the microstructure diffusion units 123u correspond to the sub-beams SCL, and a size of each of the microstructure diffusion units 123u is in a range between 10 um to 500 um. Before passing through the light diffusing element 123, each of the sub-beams SCL has a first unit light divergence angle. After passing through the light diffusing element 123, the unit light divergence angles of the sub-beams SCL are expanded, and the sub-beams SCL may form the sub illumination beams SIL required in the light path of the projection imaging system 210. In other words, in the embodiment of FIG. 1D, each of the sub illumination beams SIL may have a second unit light divergence angle, and the second unit light divergence angle is greater than the first unit light divergence angle. The first unit light divergence angle and the second unit light divergence angle are defined as light cone angles of beams known by people skilled in the art.

Meanwhile, in the embodiment of FIG. 1E, the light diffusing element 123 may also be a surface-scattering diffuser 123b, and the surface thereof has a plurality of uneven structures that are concave or convex, so as to be able to diffuse the unit light divergence angles of the sub-beams SCL and achieve the same function of the microstructure diffuser 123 of FIG. 1D. Details in this regard will not be repeated again in the following. Also, in the embodiment of FIG. 1F, the light diffusing element 123 may also be a volume-scattering diffuser 123c having a plurality of scattered particles PA inside. Therefore, the volume-scattering diffuser 123b is able to diffuse the unit light divergence angles of the sub-beams SCL and achieve the same function as that of the microstructure diffuser 123a of FIG. 1D. Details in this regard will not be repeated in the following.

Accordingly, as shown in FIGS. 1A and 1B, the illumination beam IL formed after the at least on beam CL passes through the light shaping module 120 has the light imaging matching angle MA, and the sub illumination beams SIL of the illumination beam IL for providing the respective sub image beams may also have greater second unit light divergence angles (as shown in FIG. 1G), so as to meet the requirements of the light path in the projection imaging system 210.

Specifically, referring to FIG. 1A again, in the embodiment, the projection imaging system 210 is disposed on a transmission path of the illumination beam IL, and the projection imaging system 210 includes a polarizer beam splitter (PBS) 211, a reflective light valve 213, and the pupil 214. The reflective light valve 213 may be a reflective liquid crystal on silicon (LCOS) device or a digital micro-mirror device (DMD), etc. Specifically, as shown in FIG. 1A, in the embodiment, the polarizer beam splitter 211 and the reflective light valve 213 are disposed on the transmission path of the illumination beam IL, and the pupil 214 is disposed on a transmission path of the image beam IB. For example, in the embodiment, the pupil 214 may be at the location of an exit pupil of the projection imaging system 210 or the location of the pupil of the user's eye. When the pupil 214 is located at the pupil of the user's eye, the projection apparatus may be used for virtual reality (VR).

Specifically, as shown in FIG. 1A, in the embodiment, the polarizer beam splitter 211 has a first surface S1, a second surface S2, and a third surface S3. The first surface S1 is connected with the second surface S2 and the third surface S3, and the second surface S3 and the third surface S3 are opposite to each other. The illumination beam IL has a first polarization direction (e.g., the S-polarization direction). After entering the polarizer beam splitter 211 through the first surface S1, the illumination beam IL is reflected by the polarizer beam splitter 211, exits the polarizer beam splitter 211 through the second surface, and is transmitted to the reflective light valve 213. Then, as shown in FIG. 1A, in the embodiment, the reflective light valve 213 is adapted to modulate the illumination beam IL into the image beam IB having the sub image beams SIB. In addition, the image beam IB has a second polarization direction (e.g., the P-polarization direction), and the first polarization direction is perpendicular to the second polarization direction. The image beam IB is transmitted to the polarizer beam splitter 211, enters the polarizer beam splitter 211 through the second surface S2, and passes through the polarizer beam splitter 211. Then, the image beam IB exits the polarizer beam splitter 211 through the third surface S3 of the polarizer beam splitter 211 and is transmitted to the pupil 214.

In addition, as shown in FIGS. 1A and 1H, in the embodiment, the projection imaging system 210 further includes a micro lens array 212. The respective sub illumination beams SIL form a plurality of illumination sub-regions SLR (as shown in FIG. 1H) on the reflective light valve 213 through the corresponding micro lenses in the micro lens array 212, and the sub image beams SIB are formed through the reflective light valve 213. In addition, as shown in FIGS. 1A and 1G, on the light path of the projection imaging system 210, since the main rays of all the sub illumination beams SIL on the light path are parallel light before entering the reflective light valve 213, and as shown in FIG. 1G, the second unit light divergence angles of the sub illumination beams SIL are within a range of ±10°, the light emitted by the sub illumination beams SIL and the sub image beams SIB formed from the sub illumination beams SIL travel reciprocally along the same light path and do not pass through other micro lenses adjacent to the corresponding micro lenses in the micro lens array 212. Therefore, neither stray light nor crosstalk of images may occur.

More specifically, as shown in FIG. 1A, in the embodiment, the angle at which the illumination beam IL enters the polarizer beam splitter 211 through the first surface S1 of the polarizer beam splitter 211 corresponds to the angle at which the image beam IB exits the polarizer beam splitter 211 through the third surface S3 of the polarizer beam splitter 211. In addition, the light shape of the illumination beam IL when the illumination beam IL enters the polarizer beam splitter 211 through the first surface S1 of the polarizer beam splitter 211 is similar to the light shape of the image beam IB when the image beam IB exits the polarizer beam splitter 211 through the third surface S3 of the polarizer beam splitter 211. For example, the cross-sectional areas of the light shapes are proportional to each other. Accordingly, the light imaging matching angle MA of the illumination beam IL is matched with a field of view FOV of the pupil 214, so as to meet the requirements of the light path design for the field of view FOV required in the projection imaging system 210.

Meanwhile, the second unit light divergence angles of the sub illumination beams SIL also correspond to the divergence angles of the sub image beams SIB of the image beam IB. Accordingly, the size of the pupil 214 may correspond to the size of the light emitting surface of the image beam IB, and the formed image may be sufficiently bright and of favorable quality.

Accordingly, the projection apparatus 200 is able to meet the requirements of the light path in the projection imaging system 210 through the illumination beam IL formed by the illumination system 100, thereby eliminating stray light or crosstalk of images and rendering favorable image quality and resolution.

Figure 2A:
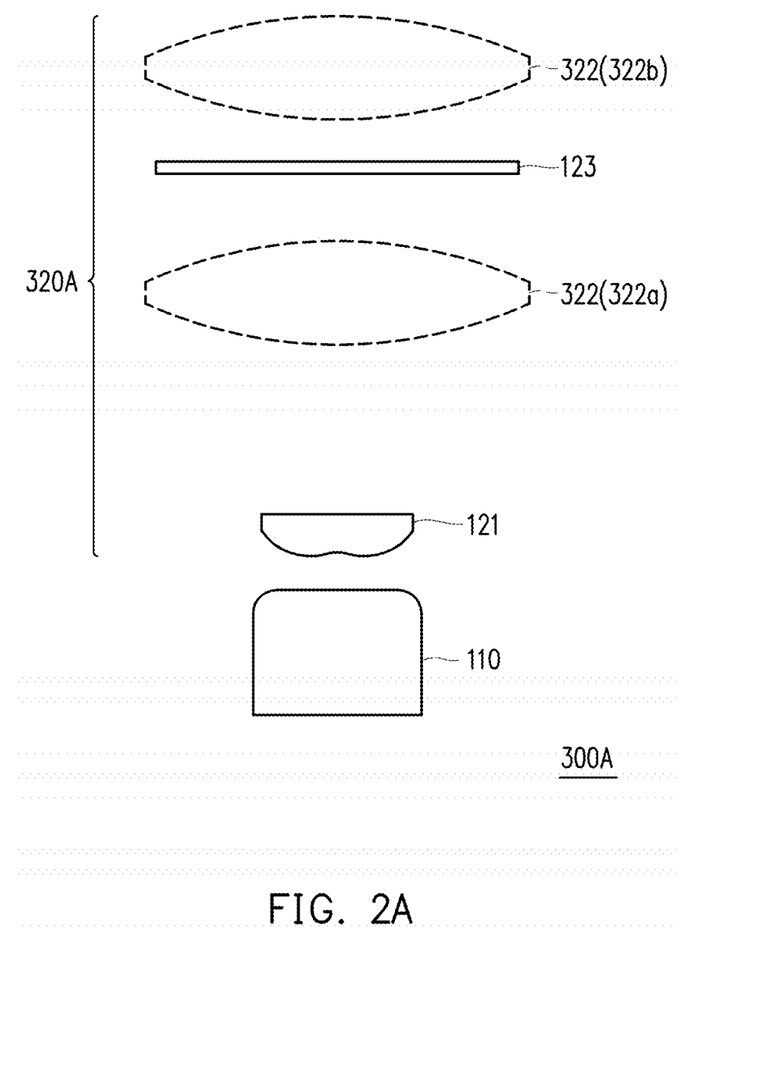
FIGS. 2A to 2C are schematic views illustrating optical frameworks of different illumination systems of FIG. 1A.
Figure 2B:
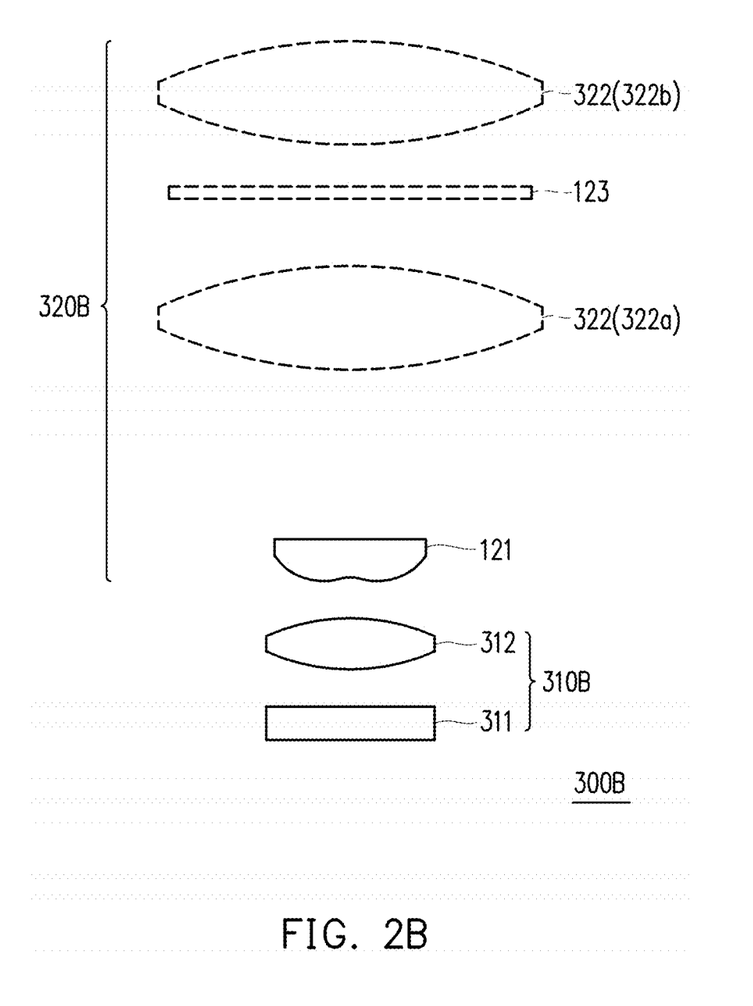
Figure 2C:
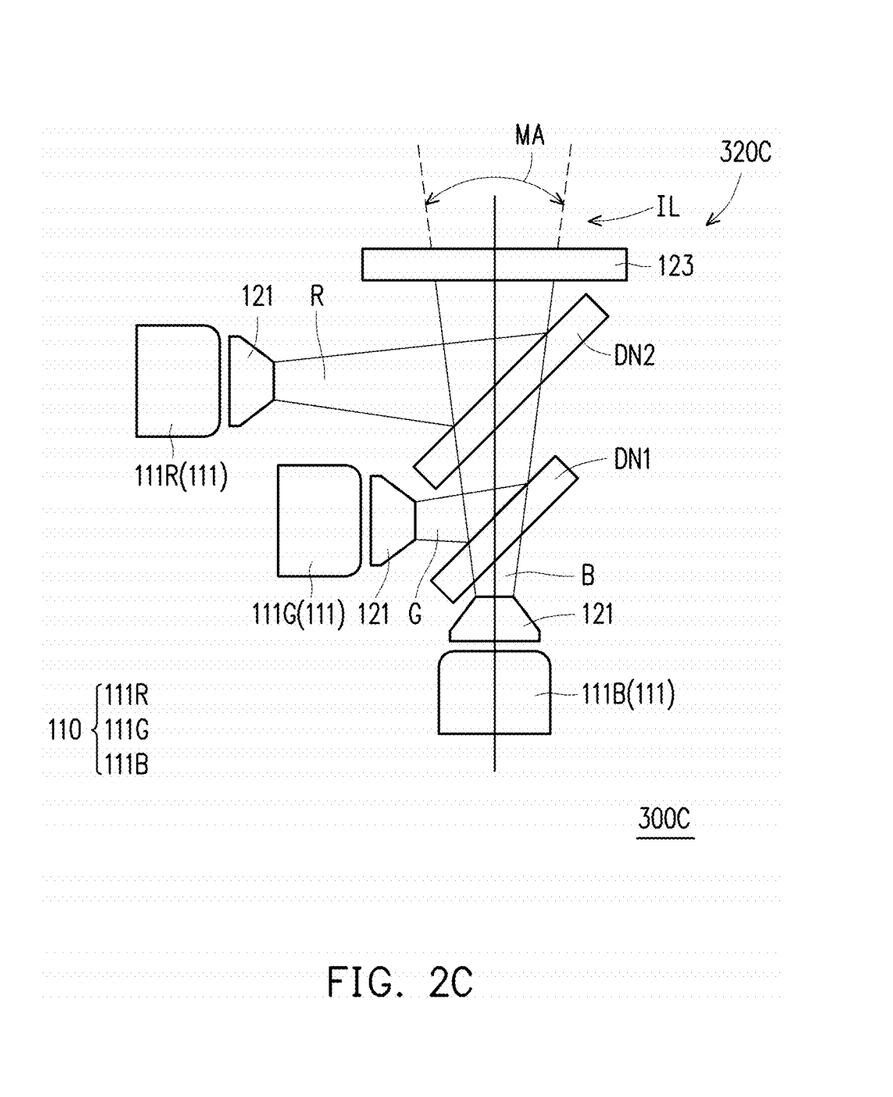

FIGS. 2A to 2C are schematic views illustrating optical frameworks of different illumination systems of FIG. 1A. Referring to FIGS. 2A to 2C, illumination systems 300A, 300B, and 300C in the embodiments of FIGS. 2A to 2C are similar to the illumination system 100 of FIG. 1B, and the differences therebetween will be described in the following.

Referring to FIG. 2A, in the embodiment, a light shaping module 320A of the illumination system 300A further includes a second lens element 322 located on the transmission path of the at least one beam CL, the at least one beam CL forms the illumination beam IL after passing through the at least one first lens element 121 and the second lens element 322, and the light imaging matching angle MA of the illumination beam IL is matched with the field of view FOV of the pupil 214. For example, in the embodiment, the second lens element 322 is a condensing lens, and may serve to converge the light imaging matching angle MA of the illumination beam IL. Specifically, as shown in FIG. 2A, in the embodiment, the second lens element 322 may be located between the first lens element 121 and the light diffusing element 123 (e.g., at the location of a second lens element 322*a* shown in FIG. 2A) or between the light diffusing element 123 and the projection imaging system 210 (e.g., at the location of a second lens element 322*b* shown in FIG. 2A). Accordingly, when the light divergence angles of the sub illumination beams SIL of the illumination beam IL are being formed, the light imaging matching angle MA of the illumination beam IL is prevented from being excessively large, so as to be adapted for the projection imaging system 210 whose pupil 214 has a smaller field of view FOV.

Meanwhile, referring to FIG. 2B, in the embodiment, a light source module 310B of the illumination system 300B includes at least one light emitting element 311 and at least one collimating lens 312. The at least one light emitting element 311 is a light emitting diode, is adapted to provide the at least one beam CL, and corresponds to the at least one collimating lens 312. The at least one beam CL is collimated by the corresponding at least one collimating lens 312. Accordingly, the light source module 310B may serve to replace the light source module 110 shown in FIG. 1B and attain a similar function. Besides, as shown in FIG. 2B, in the embodiment, the second lens element 322 may also be additionally disposed in a light shaping module 320B of the illumination system 300B to attain a function similar to the light shaping module 320A shown in FIG. 2A. Relevant descriptions may be referred to the above and therefore will not be repeated in the following. Besides, in the embodiment, since the divergence angle of the light emitting diode is greater, the light diffusing element 123 may be omitted, and it is not necessary to further diffuse the unit light divergence angles of the sub-beams SCL. When the light diffusing element 123 is omitted, the second lens element 322 is located between the at least one first lens element 121 and the projection imaging system 210 and serves to converge the light imaging matching angle MA. In other embodiments, the at least one collimating lens 312 and the at least one first lens element 121 may be replaced by a single cemented lens. The single cemented lens has the optical functions of the at least one collimating lens 312 and the at least one first lens element 121 and is also able to attain the effect shown in FIG. 2B.

Besides, referring to FIG. 2C, in the embodiment, the number of the at least one first lens element 121 and the number of the at least one light emitting element 111 of the illumination system 300C are plural, and the at least one light emitting element 111 includes a red laser element 111R, a green laser element 111G, a blue laser element 111B respectively adapted for providing a red beam R, a green beam G, and a blue beam B. In addition, the respective first lens elements 121 are disposed in front of the respective light emitting elements 111 and are respectively adapted to adjust the uniformity of the light intensity and the light shape of the red beam R, the green beam G, or the blue beam B.

Besides, as shown in FIG. 2C, in the embodiment, the light shaping module 320C further includes a plurality of dichroic mirrors DN1 and DN2. The dichroic mirrors DN1 and DN2 respectively correspond to at least part of the light emitting elements 111R, 111G, and 111B, and the dichroic mirrors DN1 and DN2 are disposed between the corresponding part of the light emitting elements 111R, 111G, and 111B and the projection imaging system. Specifically, as shown in FIG. 2C, in the embodiment, the dichroic mirror DN1 of the light shaping module 320C is located on transmission paths of the green beam G and the blue beam B, and the dichroic mirror DN1 is adapted to reflect the green beam G and allow the blue beam B to pass through, thereby allowing the green beam G and the blue beam B to be transmitted to the other dichroic mirror DN2. The other dichroic mirror DN2 is located on transmission paths of the red beam R as well as the green beam G and the blue beam B from the dichroic mirror DN1. The dichroic mirror DN1 is adapted to allow the green beam G and the blue beam B to pass through and reflect the red beam R. Accordingly, the green beam G, the blue beam B, and the red beam R are transmitted to the light diffusing element 123 of the light shaping module 320C and form the subsequent illumination beam IL.

Accordingly, the illumination beams IL formed by the illumination systems 300A, 300B, and 300C are all formed with the suitable light imaging matching angle MA by disposing the first lens element 121, and the sub-beams SCL of the illumination beam IL also have suitable unit light divergence angles, thereby meeting the requirements of the light path in the projection imaging system 210 and attaining the effects and properties similar to those of the illumination system 100. Thus, details in this regard will not be repeated in the following. Moreover, when the illumination systems 300A, 300B, and 300C are applied to the projection apparatus 200 of FIG. 1A, the projection apparatus 200 is also able to attain the same functions and effects. Other details in this regard will not be repeated in the following.

Figure 3:
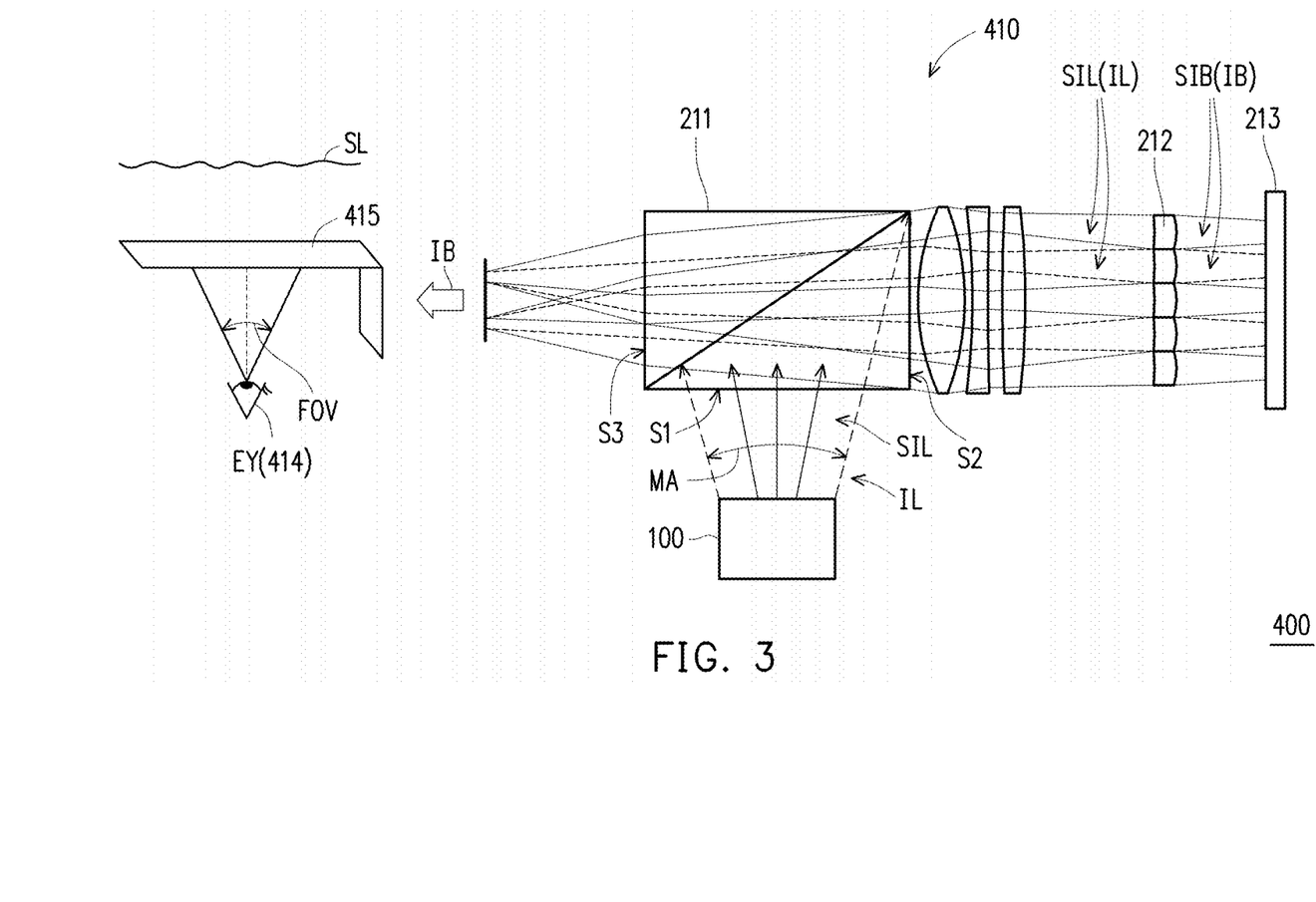
FIG. 3 is a schematic view illustrating an optical framework of another projection apparatus according to an embodiment of the invention.

FIG. 3 is a schematic view illustrating an optical framework of another projection apparatus according to an embodiment of the invention. Referring to FIG. 3, a projection imaging system 410 of a projection apparatus 400 in the embodiment of FIG. 3 is similar to the projection imaging system 210 of the projection apparatus 200 of FIG. 1A, and the difference therebetween will be described in the following. The projection imaging system 410 further includes at least one optical waveguide 415. The at least one optical waveguide 415 is located between a pupil 414 and the reflective light valve 213. More specifically, the at least one optical waveguide 415 is located between the pupil 414 and the polarizer beam splitter 211. For example, in the embodiment, the pupil 414 is the pupil of at least one eye EY of a user. In other words, in the embodiment, the at least one optical waveguide 415 is adapted to transmit the image beam IB to the at least one eye EY of the user. In addition, in the embodiment, the at least one optical waveguide 415 also allows an ambient beam SL to pass through and is therefore applicable in the field of augmented reality display technologies.

Moreover, with the illumination beam IL formed by the illumination system 100, the projection apparatus 400 may also meet the requirements of the light path in the projection imaging system 410, thereby eliminating stray light or crosstalk of images and rendering favorable image quality and resolution. Therefore, the projection apparatus 400 may also attain similar effects and properties of the projection apparatus 200. Details in this regard will not be repeated in the following.

A projection imaging system (not shown) of a projection apparatus according to another embodiment of the invention is similar to the projection imaging system 210 of the projection apparatus 200 shown in FIG. 1A, and the difference therebetween will be described in the following. The technical difference of the projection apparatus of the embodiment from the projection apparatus 200 of FIG. 1A lies in that the at least one beam CL of the embodiment does not have a single polarization direction. Therefore, a total reflection prism assembly in the projection imaging system of the embodiment may replace the polarizer beam splitter 211 of FIG. 1A. The projection imaging system of the embodiment is disposed on the transmission path of the illumination beam IL. The projection imaging system includes the total reflection prism assembly. The total reflection prism assembly includes a first prism and a second prism, and there is an air gap between the first prism and the second prism. In the embodiment, the reflective light valve of the projection imaging system includes a digital micromirror device (DMD). Specifically, in the embodiment, the total reflection prism assembly and the reflective light valve are disposed on the transmission path of the illumination beam IL. The total reflection prism assembly and the pupil 214 are disposed on the transmission path of the image beam IB. For example, in the embodiment, the pupil 214 may be at the location of the exit pupil of the projection imaging system 210 or the location of the pupil of the user's eye. When the pupil 214 is located at the pupil of the user's eye, the projection apparatus may be used for virtual reality (VR). Specifically, in the embodiment, the total reflection prism assembly has a first surface, a second surface, and a third surface. The first prism includes the first surface and the second surface. The second prism includes the third surface. The first surface is connected with the second surface. The second surface is opposite to the third surface. After the illumination beam IL enters the total reflection prism assembly through the first surface, the illumination beam IL is reflected by the total reflection prism assembly, exits the total reflection prism assembly through the second surface, and is transmitted to the reflective light valve. Then, the reflective light valve is adapted to modulate the illumination beam IL into the image beam IB having the sub image beams SIB. The image beam IB is transmitted to the total reflection prism assembly, enters the total reflection prism assembly through the second surface S2, and passes through the total reflection prism assembly. Then, the image beam IB exits the total reflection prism assembly through the third surface S3 of the total reflection prism assembly and is transmitted to the pupil 214.

In the embodiment, the projection imaging system further includes the micro lens array 212. The respective sub illumination beams SIL form the illumination sub-regions SLR (as shown in FIG. 1H) on the reflective light valve 213 through the corresponding micro lenses in the micro lens array 212, and the sub image beams SIB are formed through the reflective light valve 213. On the light path of the projection imaging system, since the main rays of all the sub illumination beams SIL on the light path are parallel light before entering the reflective light valve 213, and the second unit light divergence angles of the sub illumination beams SIL are within a range of ±10°, the light emitted by the sub illumination beams SIL and the sub image beams SIB formed from the sub illumination beams SIL travel reciprocally along the same light path and do not pass through other micro lenses adjacent to the corresponding micro lenses in the micro lens array 212. Therefore, neither stray light nor crosstalk of images is generated.

More specifically, in the embodiment, the angle at which the illumination beam IL enters the total reflection prism assembly through the first surface of the total reflection prism assembly corresponds to the angle at which the image beam IB exits the total reflection prism assembly through the third surface of the total reflection prism assembly. In addition, the light shape of the illumination beam IL when the illumination beam IL enters the total reflection prism assembly through the first surface of the total reflection prism assembly is similar to the light shape of the image beam IB when the image beam IB exits the total reflection prism assembly through the third surface of the total reflection prism assembly. For example, the cross-sectional areas of the light shapes are proportional to each other. Accordingly, the light imaging matching angle MA of the illumination beam IL is matched with the field of view FOV of the pupil 214, so as to meet the requirements of the light path design of the field of view FOV required in the projection imaging system.

Meanwhile, the second unit light divergence angles of the sub illumination beams SIL also correspond to the divergence angles of the sub image beams SIB of the image beam IB. Accordingly, the size of the pupil 214 may correspond to the size of the light emitting surface of the image beam IB, and the formed image may be sufficiently bright and of favorable quality.

Moreover, with the illumination beam IL formed by the illumination system, the projection apparatus of the embodiment may also meet the requirements of the light path in the projection imaging system, thereby eliminating stray light or crosstalk of images and rendering favorable image quality and resolution. Therefore, the projection apparatus may also attain similar effects and properties of the foregoing projection apparatus. Details in this regard will not be repeated in the following.

In view of the foregoing, the embodiments of the invention exhibit at least one of the following properties or effects. In the embodiments of the invention, by configuring the light shaping module, the illumination beam formed by the illumination system forms the suitable light imaging matching angle and the sub-beams of the illumination beam also have suitable unit light divergence angles. In addition, with the illumination beam formed by the illumination system, the projection apparatus is also able to meet the requirements of the light path in the projection imaging system, thereby eliminating stray light or crosstalk of images and rendering favorable image quality and resolution.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A projection apparatus, comprising:
    an illumination system, adapted to emit an illumination beam, and comprising:
        a light source module, adapted to emit at least one beam;
        a light shaping module, located on a transmission path of the at least one beam and adapted to adjust a light shape of the at least one beam, wherein the at least one beam forms the illumination beam after passing through the light shaping module, wherein the light shaping module comprises at least one first lens element located on the transmission path of the at least one beam and adapted to adjust uniformity of the at least one beam; and
    a projection imaging system, disposed on a transmission path of the illumination beam, and comprising a reflective light valve and a micro lens array, wherein the reflective light valve is disposed on the transmission path of the illumination beam and is adapted to modulate the illumination beam into an image beam, the micro lens array is disposed on the transmission path of the illumination beam and a transmission path of the image beam, and the micro lens array and the reflective light valve are physically separated from each other such that the illumination beam forms a parallel light before entering the reflective light valve,
    wherein the at least one first lens element is not disposed on the transmission path of the image beam.

2. The projection apparatus as claimed in claim 1, wherein there is a pupil on the transmission path of the image beam.

3. The projection apparatus as claimed in claim 2, wherein the at least one beam forms the illumination beam after passing through the at least one first lens element, and a light imaging matching angle of the illumination beam is matched with a field of view of the pupil.

4. The projection apparatus as claimed in claim 2, wherein the light shaping module further comprises a second lens element located on the transmission path of the at least one beam and between the at least one first lens element and the projection imaging system, and the at least one beam forms the illumination beam after passing through the first lens element and the second lens element, and a light imaging matching angle of the illumination beam is matched with a field of view of the pupil.

5. The projection apparatus as claimed in claim 2, wherein the projection imaging system further comprises a polarizer beam splitter disposed on the transmission path of the illumination beam, wherein the polarizer beam splitter has a first surface, a second surface, and a third surface, the first surface is connected with the second surface and the third surface, the second surface and the third surface are opposite to each other, and the illumination beam exits the polarizer beam splitter through the second surface after entering the polarizer beam splitter through the first surface, wherein the reflective light vale is adapted to transmit the image beam to the polarizer beam splitter to enter the polarizer beam splitter through the second surface, and then the image beam exits the polarizer beam splitter through the third surface of the polarizer beam splitter.

6. The projection apparatus as claimed in claim 5, wherein a light shape of the illumination beam when entering the polarizer beam splitter through the first surface of the polarizer beam splitter is similar to a light shape of the image beam when exiting the polarizer beam splitter through the third surface of the polarizer beam splitter, such that a light imaging matching angle of the illumination beam is matched with a field of view of the pupil.

7. The projection apparatus as claimed in claim 5, wherein an angle at which the illumination beam enters the polarizer beam splitter through the first surface of the polarizer beam splitter corresponds to an angle at which the image beam exits the polarizer beam splitter through the third surface of the polarizer beam splitter, such that a light imaging matching angle of the illumination beam is matched with a field of view of the pupil.

8. The projection apparatus as claimed in claim 2, wherein a size of the pupil corresponds to a size of a light emitting surface of the image beam.

9. The projection apparatus as claimed in claim 2, wherein the projection imaging system further comprises at least one optical waveguide located between the pupil and the reflective light valve.

10. The projection apparatus as claimed in claim 1, wherein the light source module comprises at least one light emitting element adapted to provide the at least one beam, the number of the at least one first lens element is the same as the number of the at least one light emitting element, and each the at least one light emitting element is disposed in correspondence with each the at least one first lens element.

11. The projection apparatus as claimed in claim 10, wherein when the number of the at least one first lens element and the number of the at least one light emitting element are plural, the light shaping module further comprises a plurality of dichroic mirrors, each of the plurality of dichroic mirrors respectively corresponds to at least part of the light emitting elements, and each of the plurality of dichroic mirrors is disposed between the corresponding at least part of the light emitting elements and the projection imaging system.

12. The projection apparatus as claimed in claim 1, wherein the at least one beam has a plurality of sub-beams, and the light shaping module further comprises a light diffusing element located on transmission paths of the plurality of sub-beams, and the plurality of sub-beams form a plurality of sub illumination beams of the illumination beam after passing through the light diffusing element, wherein each of the plurality of sub-beams has a first unit light divergence angle, each of the plurality of sub illumination beams has a second unit light divergence angle, and the second unit light divergence angle is greater than the first unit light divergence angle.

13. The projection apparatus as claimed in claim 12, wherein the second unit light divergence angles of the plurality of sub illumination beams correspond to divergence angles of a plurality of sub image beams of the image beam.

14. The projection apparatus as claimed in claim 12, wherein the light diffusing element is any one of a microstructure diffuser, a surface-scattering diffuser, a volume-scattering diffuser, and a diffraction optical element.

15. The projection apparatus as claimed in claim 14, wherein when the light diffusing element is the microstructure diffuser, the light diffusing element has a plurality of microstructure diffusion units, the microstructure diffusion units correspond to the sub-beams, and a size of each of the plurality of microstructure diffusion units is in a range between 10 um to 500 um.

16. The projection apparatus as claimed in claim 12, wherein the light shaping module further comprises a second lens element located on the transmission path of the at least one beam, and the at least one beam forms the illumination beam after passing through the first lens element and the second lens element, and a light imaging matching angle of the illumination beam matches a field of view of the pupil.

17. The projection apparatus as claimed in claim 16, wherein the second lens element is located between the first lens element and the light diffusing element.

18. The projection apparatus as claimed in claim 16, wherein the second lens element is located between the light diffusing element and the projection imaging system.

19. The projection apparatus as claimed in claim 1, wherein the light source module comprises at least one light emitting element, the light emitting element is a laser light emitting element and adapted to provide the at least one beam.

20. The projection apparatus as claimed in claim 1, wherein the light source module comprises at least one light emitting element and at least one collimating lens, the at least one light emitting element is a light emitting diode, the at least one light emitting element is adapted to provide the at least one beam and corresponds to the at least one collimating lens, and the at least one beam is collimated by the corresponding at least one collimating lens.

21. The projection apparatus as claimed in claim 1, wherein the projection imaging system comprises a total reflection prism assembly, wherein the total reflection prism assembly comprises a first prism and a second prism, there is a gap between the first prism and the second prism, and the reflective light valve comprises a digital micro-mirror device.

* * * * *